(12) United States Patent
Takahashi et al.

(10) Patent No.: US 11,590,954 B2
(45) Date of Patent: Feb. 28, 2023

(54) BRAKE DEVICE AND BRAKE CONTROL SYSTEM

(71) Applicant: Nabtesco Corporation, Tokyo (JP)

(72) Inventors: Masahiro Takahashi, Tokyo (JP); Yuto Nakai, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 105 days.

(21) Appl. No.: 16/828,120

(22) Filed: Mar. 24, 2020

(65) Prior Publication Data

US 2020/0339093 A1  Oct. 29, 2020

(30) Foreign Application Priority Data

Apr. 26, 2019  (JP) .............................. JP2019-085852

(51) Int. Cl.
*F16D 55/08* (2006.01)
*B60T 13/74* (2006.01)
(Continued)

(52) U.S. Cl.
CPC .............. *B60T 13/746* (2013.01); *B60T 7/22* (2013.01); *B60T 8/17* (2013.01); *B60T 17/221* (2013.01); *F16D 3/04* (2013.01); *F16D 65/183* (2013.01); *F16D 66/022* (2013.01); *F16H 1/32* (2013.01); *B60T 1/065* (2013.01); *B60T 2201/022* (2013.01); *B60T 2210/32* (2013.01); *B60T 2250/04* (2013.01); *F16D 2066/006* (2013.01);

(Continued)

(58) Field of Classification Search
CPC ...... F16D 3/04; F16D 65/183; F16D 2121/24; F16D 2125/26; F16D 2125/28; F16D 2125/32; B60T 13/741; F16H 1/32; F16H 2001/323

See application file for complete search history.

(56) References Cited

U.S. PATENT DOCUMENTS

| 2001/0012809 A1* | 8/2001 | Fujimoto | .................. F16H 1/32 475/162 |
| 2013/0126279 A1* | 5/2013 | Yu | ........................... F16D 55/00 188/72.1 |

(Continued)

FOREIGN PATENT DOCUMENTS

| DE | 19851668 A1 * | 5/2000 | ............. F16D 65/18 |
| DE | 102010063300 A1 * | 6/2011 | ............. F16H 25/20 |

(Continued)

OTHER PUBLICATIONS

Machine translation of DE 102010063300 (no date).*

(Continued)

*Primary Examiner* — Nicholas J Lane
(74) *Attorney, Agent, or Firm* — Pillsbury Winthrop Shaw Pittman, LLP

(57) ABSTRACT

A brake device of the present invention includes: a wheel brake unit for braking a wheel; an electric motor for driving the wheel brake unit; a speed reducer for decelerating rotation of the electric motor; a rotation-linear motion converter for converting a rotational output of the speed reducer into a linear motion; and a braking force transmission member for transmitting the linear motion produced by the rotation-linear motion converter to the wheel brake unit.

9 Claims, 9 Drawing Sheets

(51) Int. Cl.
*F16D 3/04* (2006.01)
*F16H 1/32* (2006.01)
*B60T 7/22* (2006.01)
*B60T 8/17* (2006.01)
*B60T 17/22* (2006.01)
*F16D 66/02* (2006.01)
*F16D 65/18* (2006.01)
*F16D 66/00* (2006.01)
*F16D 121/24* (2012.01)
*F16D 125/32* (2012.01)
*F16D 125/50* (2012.01)
*B60T 1/06* (2006.01)

(52) U.S. Cl.
CPC ...... *F16D 2121/24* (2013.01); *F16D 2125/32* (2013.01); *F16D 2125/50* (2013.01); *F16H 2001/323* (2013.01)

(56) References Cited

U.S. PATENT DOCUMENTS

2013/0153342 A1* 6/2013 Kim .................. B60T 13/741 188/72.3
2015/0167761 A1* 6/2015 Son .................. F16D 55/224 188/72.6
2017/0009834 A1* 1/2017 Masuda ............... F16D 66/021
2018/0038428 A1* 2/2018 Severinsson ........ F16D 55/2245
2018/0319384 A1* 11/2018 Yasui .................... B60T 13/741
2020/0062230 A1* 2/2020 Henning ............... B60T 13/741

FOREIGN PATENT DOCUMENTS

| JP | 10-510778 A | 10/1998 |
| JP | 2011-089646 A | 5/2011 |
| JP | 2014-177206 A | 9/2014 |
| JP | 2017-036000 A | 2/2017 |
| JP | 2018-044554 A | 3/2018 |
| JP | 2018-121461 A | 8/2018 |
| JP | 2019-018851 A | 2/2019 |

OTHER PUBLICATIONS

Abstract for DE 19851668 (no date).*
Notice of Reasons for Refusal dated Jan. 4, 2023, issued in corresponding Japanese Patent Application No. 2019-85852 with English translation (8 pgs.).

* cited by examiner

BRAKE DEVICE AND BRAKE CONTROL SYSTEM

TECHNICAL FIELD

The present invention relates to a brake device for braking rotation of a wheel and to a brake control system using the brake device. This application is based on and claims the benefit of priority from Japanese Patent Application Serial No. 2019-085852 (filed on Apr. 26, 2019), the contents of which are hereby incorporated by reference in their entirety.

BACKGROUND

In most brake devices for vehicles, a wheel brake unit that applies a braking force to a wheel is operated by a hydraulic actuator such as a hydraulic piston.

RELEVANT REFERENCE

List of Relevant Patent Literature

Patent Literature 1: Japanese Patent Application Publication No. 2019-18851

SUMMARY

With the recent advancement in development of autonomous vehicle driving technology, it is demanded to improve operation accuracy and responsiveness of a wheel brake unit in a brake device.

The present invention provides a brake device and a brake control system in which a wheel brake unit has an improved operation accuracy and responsiveness.

A brake device according to an embodiment of the present invention includes: a wheel brake unit for braking a wheel; an electric motor for driving the wheel brake unit; a speed reducer for decelerating rotation of the electric motor; a rotation-linear motion converter for converting a rotational output of the speed reducer into a linear motion; and a braking force transmission member for transmitting the linear motion produced by the rotation-linear motion converter to the wheel brake unit.

With the above configuration, when braking of a vehicle is required, the electric motor is operated and the rotation of the electric motor is decelerated by the speed reducer. When the rotation output section of the speed reducer rotates, the rotation is converted into a linear motion by the rotation-linear motion converter, and the linear motion is transmitted to the wheel brake unit via the braking force transmission member. As a result, the wheel brake unit is operated accurately and rapidly by the power of the electric motor and the deceleration performed by the speed reducer.

It is also possible that the rotation-linear motion converter includes: a rotary block configured to be rotated by the rotational output of the speed reducer; and a casing housing the rotary block in a rotatable manner, the casing retains the braking force transmission member such that the braking force transmission member is movable forward and backward in a direction substantially perpendicular to a rotational center axis of the rotary block, and the rotary block includes a cam mechanism for moving the braking force transmission member forward and backward at a position spaced from the rotational center axis.

With the above configuration, when braking of a vehicle is required, the electric motor is operated and the rotation of the electric motor is decelerated by the speed reducer and transmitted to the rotary block of the rotation-linear motion converter. This causes the rotary block to rotate in the casing. When the rotary block rotates in the casing, the cam mechanism moves the braking force transmission member forward and backward to operate the wheel brake unit. This simple configuration makes it possible to convert the rotation of the speed reducer into the forward and backward movement of the braking force transmission member substantially perpendicular to the axis of the speed reducer.

It is also possible that the casing has a reaction force receiving surface supporting an outer peripheral surface of the rotary block.

With the above configuration, when a reaction force from the wheel brake unit acts on the braking force transmission member, the reaction force acts to tilt the rotary block via the cam mechanism. At this time, the reaction force acting on the rotary block is received by the reaction force receiving surface of the casing. As a result, the tilt or deformation of the rotary block can be prevented.

It is also possible that the speed reducer includes a rotation output section, and the rotary block and the rotation output section are coupled to each other via an Oldham coupling.

With the above configuration, when a large reaction force acts from the wheel brake unit onto the braking force transmission member, the reaction force acts on the rotary block via the cam mechanism in the opposite direction to the drive rotation direction. This causes the intermediate piece of the Oldham coupling to slide, thereby preventing the large reaction force from acting on the speed reducer side. As a result, an excess reaction force does not act on the bearings on the speed reducer side.

It is also possible that the speed reducer includes: a support block; a crankshaft rotatably supported on the support block and configured to be rotated by a drive force of the electric motor; a revolving gear rotatably engaged with an eccentric portion of the crankshaft to revolve along with the eccentric portion, the revolving gear having outer teeth; and an outer cylinder disposed on an outer peripheral side of the revolving gear and configured to mesh with the outer teeth of the revolving gear, the outer cylinder retaining inner tooth pins on an inner peripheral surface thereof, a number of the inner tooth pins being larger than a number of the outer teeth, one of the support block and the outer cylinder is fixed on an outside member, and the other of the support block and the outer cylinder serves as a rotation output section.

With the above configuration, the rotation of the electric motor is decelerated and transmitted to the rotation-linear motion converter accurately and rapidly by the speed reducer, which includes the support block, the crankshaft, the revolving gear, and the outer cylinder.

A brake device according to an embodiment of the present invention includes: a wheel brake unit for braking a wheel; an electric motor for driving the wheel brake unit; a speed reducer for decelerating rotation of the electric motor; a rotation-linear motion converter for converting a rotational output of the speed reducer into a linear motion; and a braking force transmission member for transmitting the linear motion produced by the rotation-linear motion converter to the wheel brake unit, wherein the rotation-linear motion converter includes: a rotary block configured to be rotated by the rotational output of the speed reducer; and a casing housing the rotary block in a rotatable manner and retaining the braking force transmission member such that the braking force transmission member is movable forward and backward in a direction substantially perpendicular to a rotational center axis of the rotary block, and wherein the rotary block includes a cam mechanism for moving the braking force transmission member forward and backward at a position spaced from the rotational center axis, wherein the casing has a reaction force receiving surface supporting an outer peripheral surface of the rotary block, and wherein the rotary block and a rotation output section of the speed reducer are coupled to each other via an Oldham coupling.

A brake control system according to an embodiment of the present invention includes: a brake device including: a wheel brake unit for braking a wheel; an electric motor for driving the wheel brake unit; a speed reducer for decelerating rotation of the electric motor; a rotation-linear motion converter for converting a rotational output of the speed reducer into a linear motion; and a braking force transmission member for transmitting the linear motion produced by the rotation-linear motion converter to the wheel brake unit; an object detecting device for detecting an object outside a vehicle; a vehicle speed sensing device for sensing a running speed of the vehicle; and a brake control device configured to receive signals from the object detecting device and the vehicle speed sensing device and control the electric motor of the brake device in accordance with a distance between the vehicle and the object outside the vehicle and the running speed of the vehicle.

With the above configuration, when the object detecting device detects an object outside the vehicle, the brake control device controls the electric motor of the brake device in accordance with a distance between the vehicle and the object outside the vehicle and the running speed of the vehicle. This makes it possible to maintain an appropriate distance between the vehicle and the object outside the vehicle. In particular, the brake device used in the above brake control system can operate the wheel brake unit accurately and rapidly by the power of the electric motor and the deceleration performed by the speed reducer. Accordingly, the above brake control system can rapidly modify the distance between the vehicle and the object outside the vehicle so as to approach the target distance.

It is also possible that the brake control system further includes: a motor rotation sensing unit for sensing an amount of rotation of the electric motor from an initial position to a braking position thereof; and a wear determination unit for determining whether or not the wheel brake unit is worn based on a sensing result of the motor rotation sensing unit.

With the above configuration, the wear determination unit determines whether or not the wheel brake unit is worn based on a sensing result of the motor rotation sensing unit, making it possible to replace the parts of the wheel brake unit at appropriate timings.

It is also possible that the brake control system further includes an alert unit for giving an alert when the wear determination unit determines that the wheel brake unit is worn to a prescribed level or more.

With the above configuration, the alert unit gives an alert when the wheel brake unit is worn to a prescribed level or more, making it possible to inform the driver of the appropriate timing of replacing the parts of the wheel brake unit.

Advantages

In the brake device and the brake control system described above, the wheel brake unit has an improved operation accuracy and responsiveness.

DESCRIPTION OF THE EMBODIMENTS

Embodiments of the present invention will be hereinafter described with reference to the drawings. In the following embodiments, like elements will be denoted by the same reference signs and redundant descriptions will be partly omitted.

First Embodiment

Figure 1:
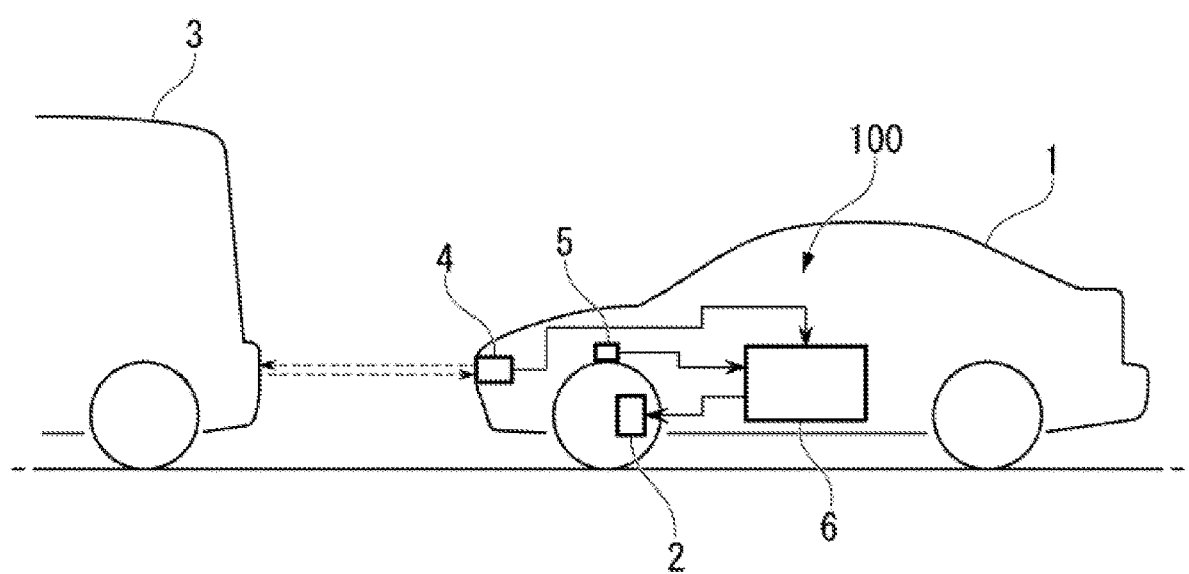
FIG. 1 is a side view of a vehicle schematically showing a brake control system according to a first embodiment.

A description is first given of the first embodiment shown in FIGS. 1 to 8. FIG. 1 is a schematic side view of a vehicle 1 including a brake control system 100 according to the embodiment. In FIG. 1, the reference sign 3 denotes another vehicle running in front of the vehicle 1. The brake control system 100 includes an electric brake device 2, an object detecting device 4, a vehicle speed sensing device 5, and a brake control device 6. The object detecting device 4 is, for example, a camera or a sensor (e.g., a radar) for detecting an object outside the vehicle 1, such as the vehicle 3 running in front thereof. The vehicle speed sensing device 5 senses the speed of the vehicle 1. The brake control device 6 receives detection signals from the object detecting device 4 and the vehicle speed sensing device 5 and controls the brake device 2. The brake control system 100 can switch between or combine together the autonomous control of the brake device 2 performed by the brake control device 6 and the manual operation of the brake device 2 through the brake pedal operation performed by the driver.

Figure 2:
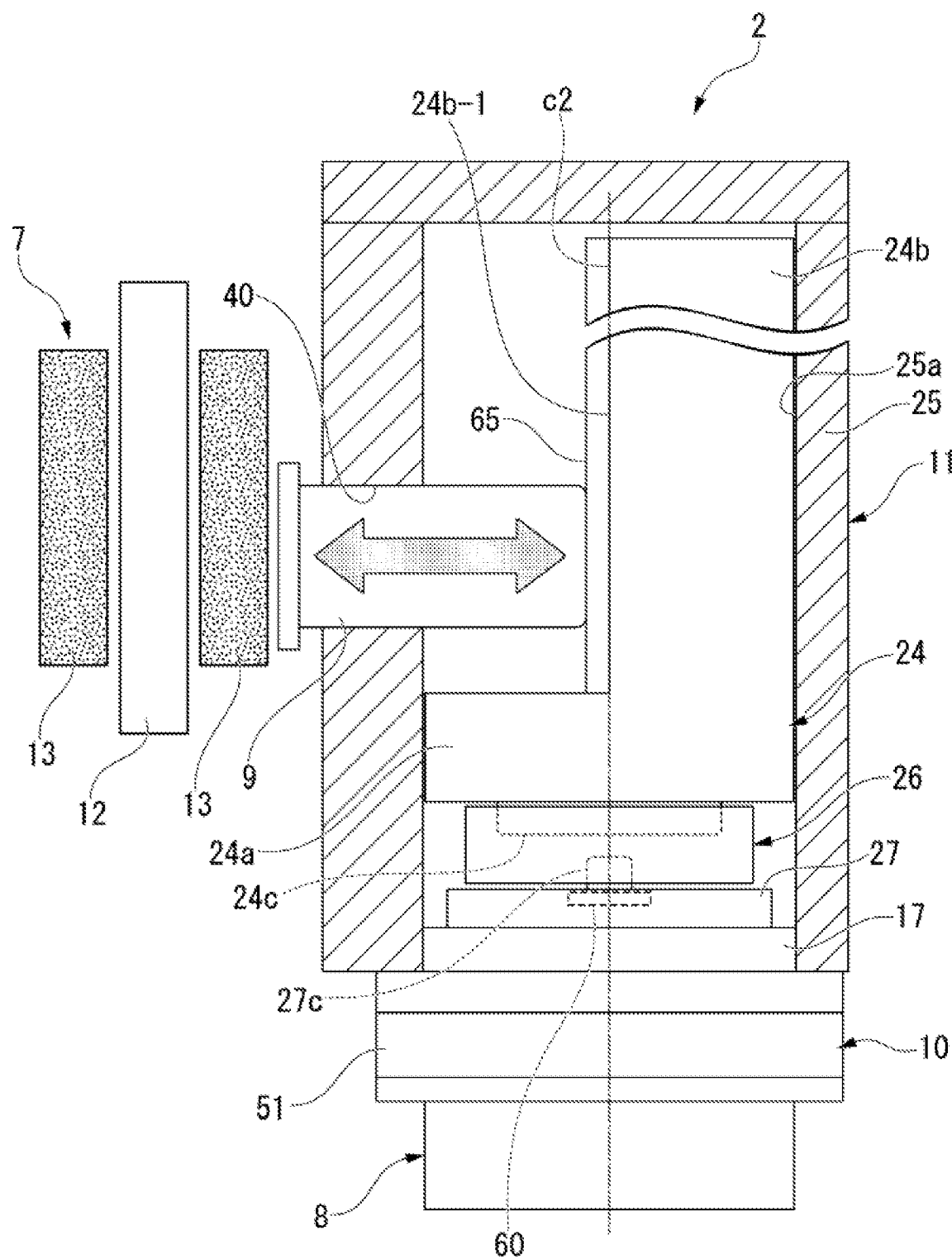
FIG. 2 is a longitudinal sectional view of a brake device according to the first embodiment.

FIG. 2 is a longitudinal sectional view of the brake device 2 according to the embodiment. The brake device 2 includes: a wheel brake unit 7 for braking a wheel (not shown); an electric motor 8 for driving the wheel brake unit 7; a speed reducer 10 for decelerating the rotation of the electric motor 8; a rotation-linear motion converter 11 for converting the rotational output of the speed reducer 10 into a linear motion; and a piston 9 serving as a braking force transmission member for transmitting the linear motion produced by the rotation-linear motion converter 11 to the wheel brake unit 7.

The wheel brake unit 7 includes, for example, a brake disk 12 and brake pads 13. The brake disk 12 rotates integrally with the wheel, and the brake pads 13 are pressed against the opposite side surfaces of the brake disk 12 for braking. The brake pads 13 are pressed by the piston 9 that serves as the braking force transmission member. The wheel brake unit 7 may use other wheel brake mechanisms such as a drum brake, instead of the disk brake used in the embodiment.

The electric motor 8 is capable of increasing or decreasing the torque in accordance with the control of the supplied electric current and switching between the forward and reverse rotations. The output shaft of the electric motor 8 is connected to a speed reduction mechanism positioned upstream in the speed reducer 10, which will be described later.

Figure 3:
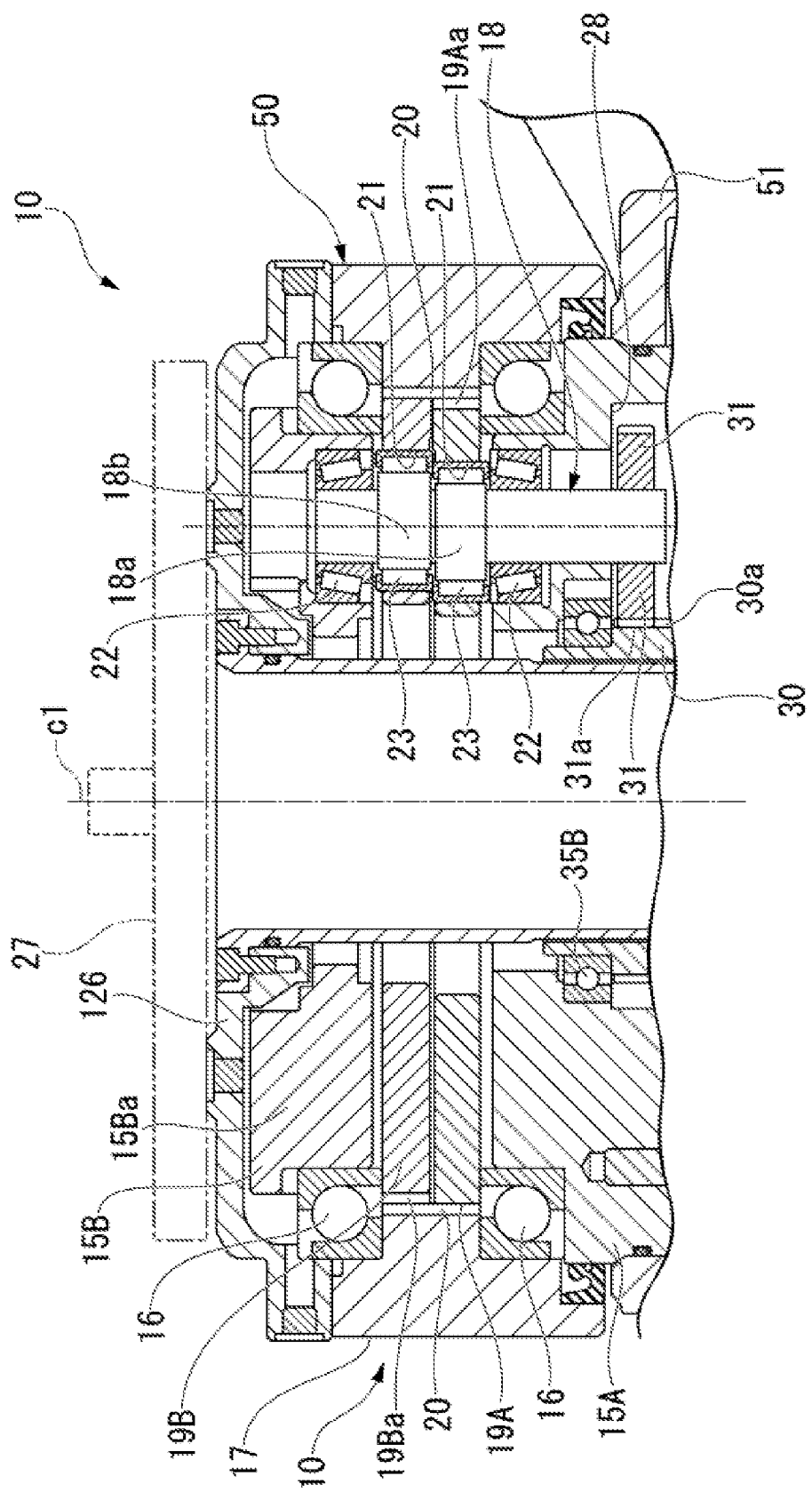
FIG. 3 is a longitudinal sectional view of a speed reducer used in the brake device according to the first embodiment.

The speed reducer 10 has such a structure as shown in FIG. 3. FIG. 3 is a longitudinal sectional view of a part of the speed reducer 10. The speed reducer 10 includes the speed reduction mechanism (not shown) and a main speed reduction unit 50. The speed reduction mechanism is formed of speed reduction gears and positioned upstream, and the main speed reduction unit 50 is connected to an output section of the speed reduction mechanism. The speed reduction mechanism, which is positioned upstream, is housed in a speed reducer casing 51 (see FIG. 2) mounted to the vehicle body. As shown in FIG. 2, the electric motor 8 is mounted to the speed reducer casing 51. The output shaft of the electric motor 8 has an output gear (not shown) mounted thereto. Along with other gears, the output gear forms the speed reduction mechanism positioned upstream in the speed reducer casing 51. The main speed reduction unit 50 further decelerates the rotation input from the speed reduction mechanism positioned upstream and transmits the decelerated rotation to the output side.

The main speed reduction unit 50 includes a first carrier block 15A and a second carrier block 15B, an outer cylinder 17, a plurality (three) of crankshafts 18, and a first revolving gear 19A and a second revolving gear 19B. The first carrier block 15A and the second carrier block 15B are support blocks connected to the speed reducer casing 51. The outer cylinder 17 is rotatably supported via bearings 16 on the outer peripheral side of the first carrier block 15A and the second carrier block 15B. The plurality (three) of crankshafts 18 are rotatably supported by the first carrier block 15A and the second carrier block 15B. The first revolving gear 19A and the second revolving gear 19B revolve along with two eccentric portions 18a, 18b of each crankshaft 18, respectively. The reference sign c1 in FIG. 3 denotes the rotational center axis c1 of the output section of the speed reducer 10.

The first carrier block 15A has a disk-like shape with a hole formed therein. The first carrier block 15A is integrally fixed to the speed reducer casing 51 by a bolt or other fasteners. The second carrier block 15B is fixed to the first carrier block 15A by a bolt or other fasteners. The second carrier block 15B includes a substrate portion 15B*a* and a plurality of support columns (not shown). The substrate portion 15B*a* has a disk-like shape with a hole formed therein, and the plurality of support columns extend from the end surface of the substrate portion 15B*a* toward the first carrier block 15A. In the second carrier block 15B, the end surfaces of the support columns face the end surface of the first carrier block 15A, and the support columns are fixed to the first carrier block 15A. An axial gap is maintained between the first carrier block 15A and the substrate portion 15B*a* of the second carrier block 15B. In this gap, there are disposed the first revolving gear 19A and the second revolving gear 19B. The first revolving gear 19A and the second revolving gear 19B have relief holes (not shown) penetrated by the support columns of the second carrier block 15B. The relief holes have sufficiently larger inner diameter than the support columns such that the support columns do not prevent the revolving operation of the first revolving gear 19A and the second revolving gear 19B.

The outer cylinder 17 extends from the outer peripheral surface of the first carrier block 15A and the outer peripheral surface of the substrate portion 15B*a* of the second carrier block 15B. The axially opposite ends of the outer cylinder 17 are rotatably supported by the first carrier block 15A and the substrate portion 15B*a* of the second carrier block 15B, respectively, via the bearings 16. In the inner peripheral surface of the axially middle region of the outer cylinder 17 (the region facing the outer peripheral surfaces of the first revolving gear 19A and the second revolving gear 19B), there are formed a plurality of pin grooves (not shown) extending in parallel with the rotational center axis c1. Each of the pin grooves receives an inner tooth pin 20 therein. The inner tooth pins 20 have a substantially cylindrical shape and are received in a rotatable manner. The plurality of inner tooth pins 20 attached to the inner peripheral surface of the outer cylinder 17 face the outer peripheral surfaces of the first revolving gear 19A and the second revolving gear 19B.

The first revolving gear 19A and the second revolving gear 19B have an outer diameter slightly smaller than the inner diameter of the outer cylinder 17. On the outer peripheral surfaces of the first revolving gear 19A and the second revolving gear 19B, there are formed outer teeth 19A*a*, 19B*a*, respectively, so as to contact in a meshing manner with the plurality of inner tooth pins 20 disposed on the inner peripheral surface of the outer cylinder 17. The respective numbers of the outer teeth 19A*a*, 19B*a* formed on the outer peripheral surfaces of the first revolving gear 19A and the second revolving gear 19B are slightly smaller than the number of the inner tooth pins 20 (by one, for example).

The plurality of crankshafts 18 are arranged in the same circumference centered at the rotational center axis c1 of the first carrier block 15A and the second carrier block 15B. Each of the crankshafts 18 is rotatably supported by the first carrier block 15A and the second carrier block 15B via the bearings 22. The eccentric portions 18*a*, 18*b* of each of the crankshafts 18 penetrate the first revolving gear 19A and the second revolving gear 19B, respectively. The eccentric portions 18*a*, 18*b* are rotatably engaged via eccentric portion bearings 23 with support holes 21 formed in the first revolving gear 19A and the second revolving gear 19B, respectively. The two eccentric portions 18*a*, 18*b* of each crankshaft 18 are positioned eccentrically so as to be out of phase with each other by 180° around the axis of the crankshaft 18.

When the plurality of crankshafts 18 receive an external force and rotate in one direction, the eccentric portions 18*a*, 18*b* of each crankshaft 18 revolve in the same direction at a predetermined radius, such that the first revolving gear 19A and the second revolving gear 19B revolve in the same direction at the predetermined radius. Simultaneously, the outer teeth 19A*a*, 19B*a* of the first revolving gear 19A and the second revolving gear 19B contact in a meshing manner with the plurality of inner tooth pins 20 retained on the inner peripheral surface of the outer cylinder 17.

In the speed reducer 10 of the embodiment, the number of the inner tooth pins 20 retained on the outer cylinder 17 is slightly larger than the respective numbers of the outer teeth 19A*a*, 19B*a* of the first revolving gear 19A and the second revolving gear 19B. Therefore, while the first revolving gear 19A and the second revolving gear 19B make one revolution, the outer cylinder 17 is pushed to rotate by a predetermined pitch in the same direction as the revolution of the first and second revolving gears 19A, 19B. As a result, the rotation of the crankshafts 18 is decelerated significantly and is output as the rotation of the outer cylinder 17. In the embodiment, since the eccentric portions 18a, 18b of each crankshaft 18 are positioned eccentrically so as to be out of phase with each other by 180° around the axis, the first revolving gear 19A and the second revolving gear 19B revolve out of phase with each other by 180°.

On one axial end of the outer cylinder 17, there is mounted an output plate 126 having a disk-like shape with a hole formed therein. The output plate 126 covers an end of the second carrier block 15B in a contactless manner. In the embodiment, the output plate 126 has an adapter block 27 integrally mounted thereon. In addition, the output section of the speed reducer 10, for example, the adapter block 27, is provided with a torque sensor 60 for detecting a torque acting on the output section. The torque sensor 60 is connected to the input section of the brake control device 6.

As described above, in the embodiment, the first carrier block 15A and the second carrier block 15B are fixed to the speed reducer casing 51, and the output cylinder 17 is formed as an output rotator. Conversely, it is also possible that the outer cylinder 17 is fixed to the speed reducer casing 51, and the first carrier block 15A and the second carrier block 15B are formed as output rotators.

As shown in FIG. 2, the rotation-linear motion converter 11 includes a rotary block 24 and a casing 25. The rotary block 24 is rotated by the rotational output of the speed reducer 10, and the casing 25 houses the rotary block 24 in a rotatable manner. The casing 25 has a bottomed cylindrical shape with one axial end thereof closed. To the other axial end of the casing 25, the speed reducer 10 is attached such that the outer cylinder 17 and the adapter block 27 are inserted in the opening. The rotary block 24 includes a base portion 24a having a short-axis cylindrical shape and a cam block portion 24b having a half cylindrical shape. The cam block portion 24b is integrally connected to the base portion 24a. The base portion 24a of the rotary block 24 is connected at an end surface thereof opposite to the cam block portion 24b to the adapter block 27 of the speed reducer 10 via an Oldham coupling 26. The peripheral wall of the casing 25 has a through-hole 40 formed therein, and the piston 9 that serves as a braking force transmission member is slidably inserted in the through-hole 40. The through-hole 40 of the casing 25 retains the piston 9 such that the piston 9 is movable forward and backward in the direction substantially perpendicular to the rotational center axis c2 of the rotary block 24.

Figure 4:
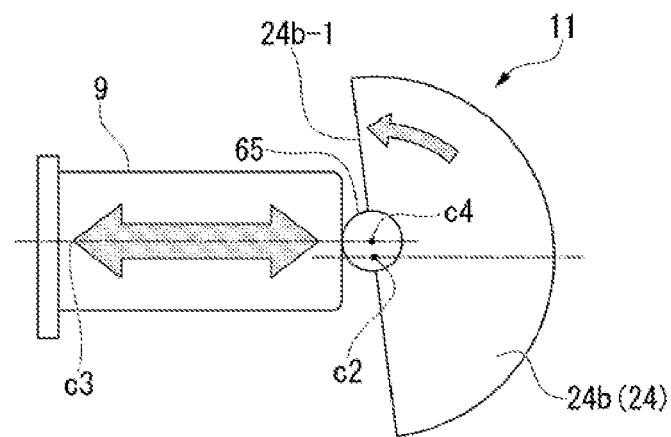
FIG. 4 is a schematic top view of a rotation-linear motion converter used in the brake device according to the first embodiment.

FIG. 4 is a schematic top view of the cam block portion 24b of the rotary block 24 and the piston 9. As shown in FIG. 4, the piston 9 is built in the casing 25 such that the center axis c3 of the piston 9 is offset by a preset amount in one direction from the rotational center axis c2 of the rotary block 24. The rotary block 24 has a piston pressing pin 65 having a cylindrical shape embedded in the flat surface 24b-1 of the cam block portion 24b having a half cylindrical shape so as to be parallel to the rotational center axis c2 of the rotary block 24. The piston pressing pin 65 is embedded in a position offset by a preset amount radially outward from the rotational center axis c2 of the rotary block 24. The position of the piston pressing pin 65 embedded is set such that when the rotary block 24 is in the initial rotational position (when the rotary block 24 is in a rotational position where the flat surface 24b-1 is substantially perpendicular to the central axis c3 of the piston 9), the center axis c4 of the piston pressing pin 65 is offset by substantially the same amount in the same direction as the center axis c3 of the piston 9. A part (about a half) of the outer peripheral surface of the piston pressing pin 65, which is embedded in the flat surface 24b-1 of the cam block portion 24b, projects forward from the flat surface 24b-1 in an arc-like shape. When the rotary block 24 rotates in one direction around the rotational center axis c2, the outer peripheral surface of the piston pressing pin 65 presses the end surface of the piston 9. The piston 9 is pressed in the outward direction of the casing 25 and presses the brake pads 13 of the wheel brake unit 7 against the brake disk 12. This embodiment includes a cam mechanism in which the piston pressing pin 65 embedded in the cam block portion 24b moves the piston 9 (braking force transmission member) forward and backward at the position spaced from the rotational center axis c2.

The inner peripheral surface 25a of the peripheral wall of the casing 25 has a circular shape and faces the outer peripheral surface of the rotary block 24. At least when a reaction force from the wheel brake unit 7 (piston 9) acts on the rotary block 24, the inner peripheral surface 25a of the peripheral wall contacts with the outer peripheral surface of the rotary block 24 and receives the reaction force from the wheel brake unit 7. In the embodiment, the inner peripheral surface 25a of the peripheral wall of the casing 25 forms a reaction force receiving surface.

Figure 5:
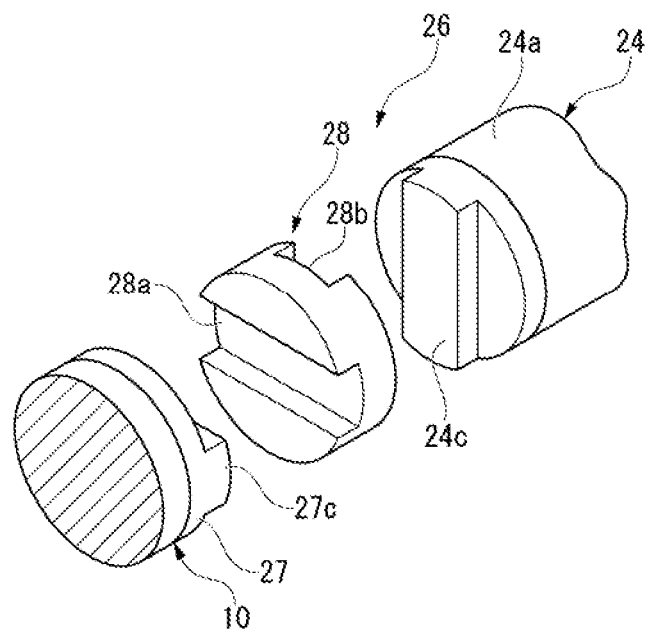
FIG. 5 is an exploded perspective view of an Oldham coupling used in the brake device according to the first embodiment.

FIG. 5 is an exploded perspective view showing a structure of the Oldham coupling 26. As shown in FIG. 5, the Oldham coupling 26 includes an input-side projection 27c, an output-side projection 24c, and a floating block 28 (intermediate piece). The input-side projection 27c is disposed on the end surface of the adapter block 27 on the speed reducer 10 side so as to project therefrom. The output-side projection 24c has a rectangular section and is disposed on the end surface of the base portion 24a of the rotary block 24 so as to project therefrom. The floating block 28 has a short-axis cylindrical shape and is interposed between the end surface of the adapter block 27 and the rotary block 24. The floating block 28 has an input-side slide groove 28a and an output-side slide groove 28b formed in one end surface and the other end surface thereof, respectively. The input-side slide groove 28a slidably receives the input-side projection 27c, and the output-side slide groove 28b slidably receives the output-side projection 24c. The input-side slide groove 28a and the output-side slide groove 28b extend along the radial direction of the floating block 28 so as to be perpendicular to each other. In the embodiment, the input-side projection 27c and the output-side projection 24c are elongated along the corresponding slide grooves. However, the shapes of the input-side projection 27c and the output-side projection 24c are not limited to those in the embodiment.

In the Oldham coupling 26, a rotary torque is input from the adapter block 27 (speed reducer 10) side. The rotary torque is transmitted to the rotary block 24, while the input-side slide groove 28a and the output-side slide groove 28b of the floating block 28 remain engaged with the input-side projection 27c and the output-side projection 24c, respectively. When a large rotary reaction force acts from the rotary block 24 side, the floating block 28 slides appropriately at engagement portions on opposite sides thereof, so as to release the rotary reaction force input thereto and prevent a large load from acting on the speed reducer 10 side.

Figure 6:
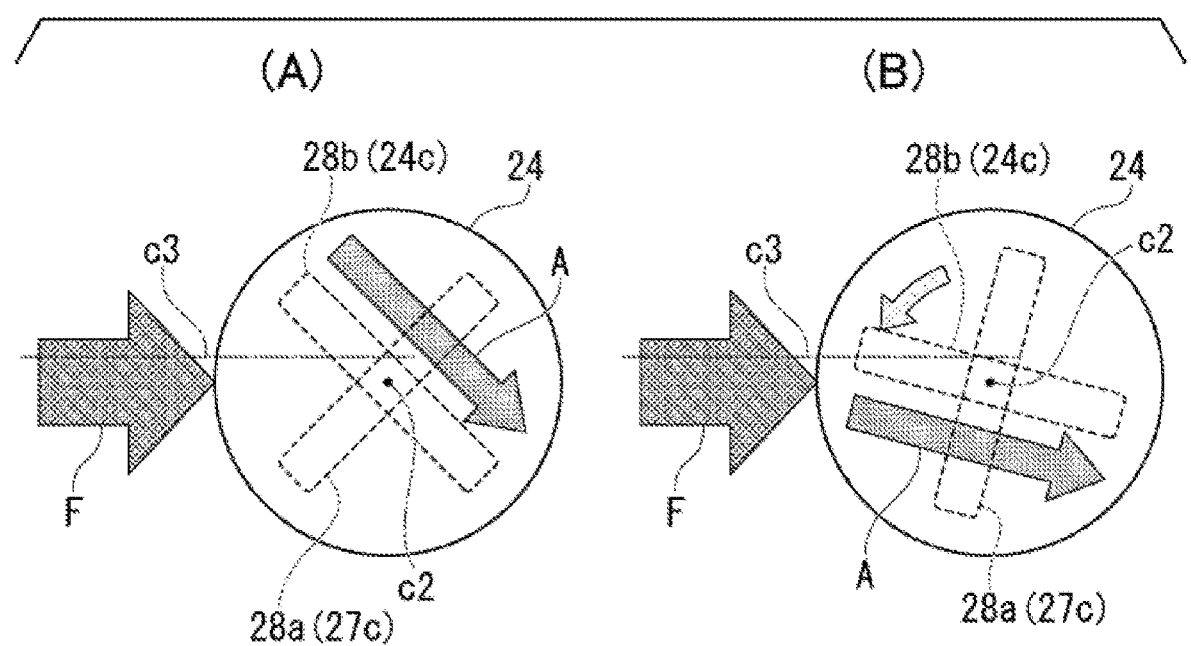
FIG. 6 is an operation diagram of the Oldham coupling used in the brake device according to the first embodiment.

FIG. 6 is an operation diagram of the Oldham coupling 26 showing an operation performed when a large rotary reaction force acts from the rotary block 24 side (wheel brake unit 7 side). FIG. 6 shows top views of the rotary block 24. Part (A) of FIG. 6 shows a state of an initial stage in a breaking operation with a small reaction force, and Part (B) of FIG. 6 shows a state of a later stage in the breaking operation with a large reaction force. When receiving rotations from the speed reducer 10, the rotary block 24 rotates within an angular range smaller than 90°, thereby pressing the piston 9. This rotational range of the rotary block 24 is hereinafter referred to as "the braking rotational range." Within the braking rotational range of the rotary block 24, the output-side slide groove 28b and the input-side slide groove 28a of the floating block 28 are configured to extend in the directions not perpendicular to the direction of the reaction force acting from the piston 9 (the direction along the center axis c3 of the piston 9). When a reaction force acts from the piston 9 onto the rotary block 24 in braking the wheel, the floating block 28 receives the reaction force and slides along at least one of the output-side slide groove 28b and the input-side slide groove 28a. The Oldham coupling 26 thus releases the reaction force acting from the piston 9. The arrows F in FIG. 6 indicate the direction of the reaction force acting from the piston 9, and the arrows A indicate the directions in which the Oldham coupling 26 releases the reaction force.

Figure 7:
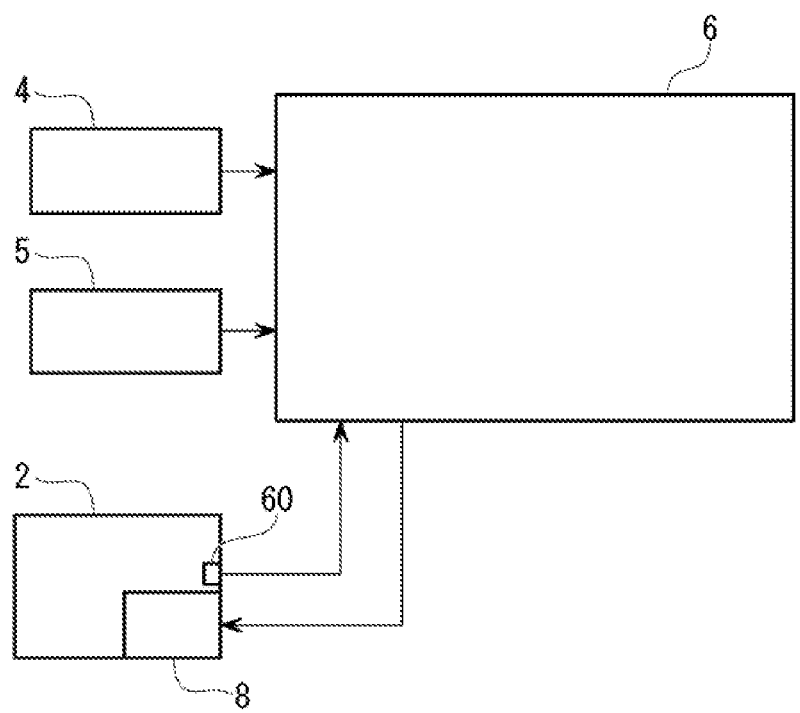
FIG. 7 is a control block diagram of the brake control system according to the first embodiment.

FIG. 7 shows control blocks of the brake control system 100 according to the embodiment. As shown in FIG. 7, the brake control device 6 is connected at an input side thereof with the object detecting device 4 such as a camera or a sensor, the vehicle speed sensing device 5, and the torque sensor 60 of the speed reducer 10. The brake control device 6 is also connected at an output side thereof with the electric motor 8 of the brake device 2. When the wheel is braked thorough the brake pedal operation performed by the driver, the brake control device 6 issues a rotation instruction to the electric motor 8 in accordance with the amount of the brake pedal operation. The rotation of the electric motor 8 is decelerated in the speed reducer 10 and then converted into the linear motion of the piston 9 in the rotation-linear motion converter 11, and the wheel brake unit 7 brakes the wheel.

Figure 8:
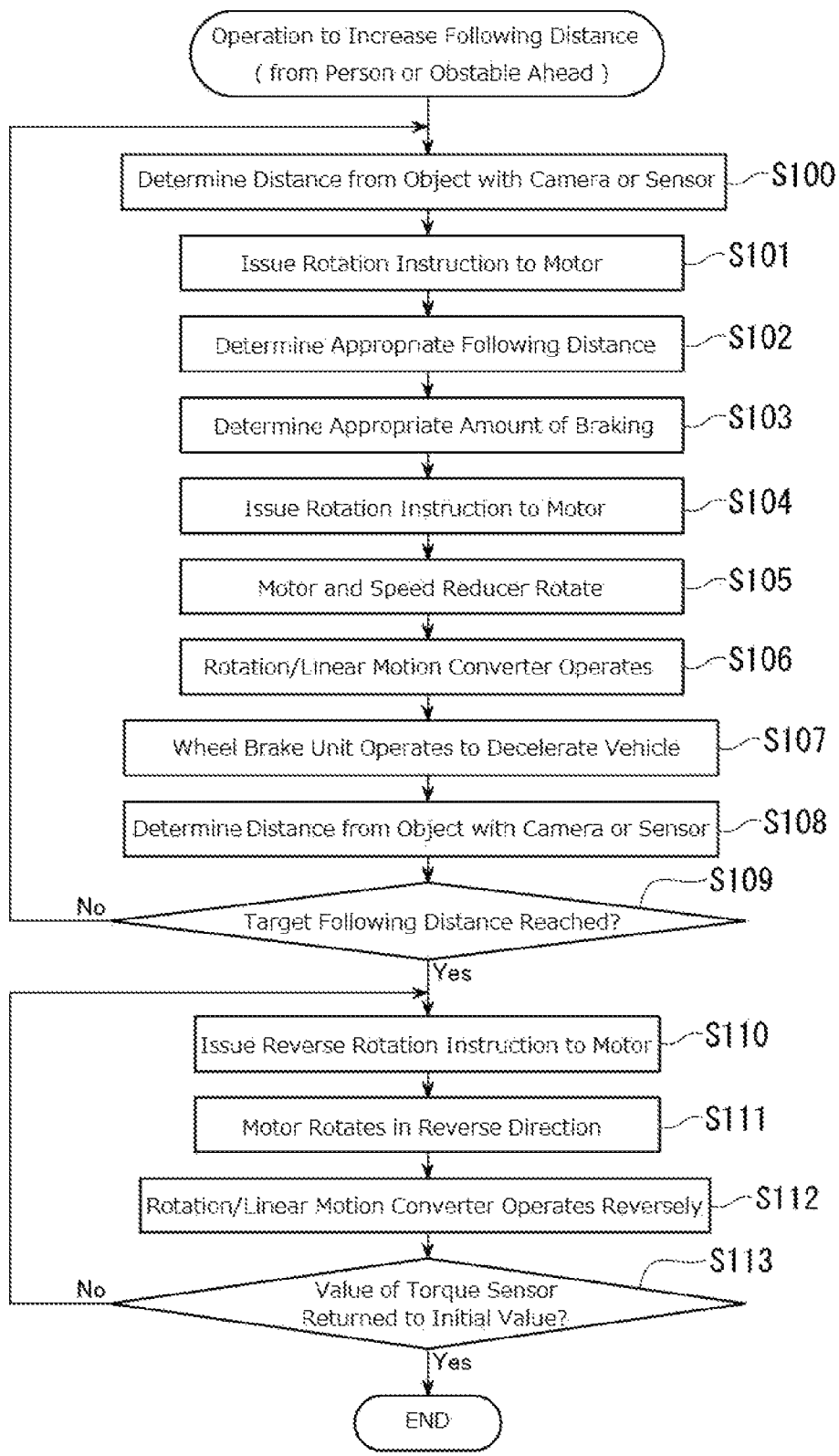
FIG. 8 is a flowchart showing an example of control of the brake control system according to the first embodiment.

FIG. 8 is a flowchart showing an example of control in which the brake control device 6 performs autonomous control of the brake device 2 in accordance with signals input from the object detecting device 4 and the vehicle speed sensing device 5. A description is hereinafter given of an example of the autonomous control of the brake device 2 with reference to FIG. 8.

In step S100, the distance between an object (a vehicle running in front) and the vehicle 1 is determined (calculated) based on a signal from the object detecting device 4 such as a camera or a sensor. In steps S101, S102, and S103, a rotation instruction to the electric motor 8 is issued, and the appropriate following distance and the appropriate amount of braking at that time are determined (calculated). Subsequently, in step S104, a rotation instruction is issued to the electric motor 8. In step S105, the electric motor 8 rotates and its rotation is decelerated by the speed reducer 10. In step S106, the rotation decelerated by the speed reducer 10 is converted into a linear motion by the rotation-linear motion converter 11. In step S107, the linear motion produced by the rotation-linear motion converter 11 actuates the piston 9, and the wheel brake unit 7 brakes the wheel. As a result, the vehicle is decelerated. Subsequently, in step S108, the distance between the object (for example, the vehicle running in front) and the vehicle 1 (the following distance) is determined (calculated) based on a signal from the object detecting device 4 such as a camera or a sensor. In step S109, it is determined whether or not the following distance has been increased to the target distance, and when not, the control returns to step S100. When the following distance has increased to the target distance, the control proceeds to step S110, where a reverse rotation instruction is issued to the electric motor 8. In step S111, the electric motor 8 rotates in the reverse direction, and in step S112, the rotation-linear motion converter 11 operates in the reverse direction. In step S113, it is determined whether or not the value of the torque sensor 60 provided on the speed reducer 10 has returned to its initial value, and when not, the control returns to step S110. When it is determined in step S113 that the value of the torque sensor 60 has returned to its initial value, the control ends the above processing.

As described above, the brake device 2 according to the embodiment includes: the electric motor 8; the speed reducer 10 for decelerating the rotation of the electric motor 8; the rotation-linear motion converter 11 for converting the rotational output of the speed reducer 10 into a linear motion; the piston 9 for transmitting the linear motion produced by the rotation-linear motion converter 11 to the wheel brake unit 7; and the wheel brake unit 7 for braking the wheel in response to the operation of the piston 9. Therefore, the brake device 2 of the embodiment can operate the wheel brake unit 7 accurately and rapidly by the power of the electric motor 8 and the deceleration performed by the speed reducer 10.

In the brake device 2 of the embodiment, the rotation-linear motion converter 11 includes the rotary block 24 and the casing 25 that houses the rotary block 24 in a rotatable manner. Further, the rotary block 24 is connected to the output section side of the speed reducer 10, and the casing 25 retains the piston 9 that moves forward and backward in the direction substantially perpendicular to the rotational center axis c2 of the rotary block 24. In addition, the rotary block 24 includes the cam block portion 24b (flat surface 24b-1) that moves the piston 9 forward and backward at the position spaced from the rotational center axis c2. Therefore, in spite of its extremely simple structure, the rotation-linear motion converter 11 used in the brake device 2 of the embodiment is capable of converting the rotation of the speed reducer 10 into the forward and backward movement of the piston 9 substantially perpendicular to the axis of the speed reducer 10.

Further, in the rotation-linear motion converter 11 used in the brake device 2 of the embodiment, the inner peripheral surface 25a of the casing 25 is capable of contacting with the outer peripheral surface of the rotary block 24. In addition, when a reaction force acts from the wheel brake unit 7 onto the rotary block 24 via the piston 9, the reaction force can be received by the inner peripheral surface 25a of the casing 25. Accordingly, this arrangement makes it possible to prevent tilting or deformation of the rotary block 24 due to the reaction force from the wheel brake unit 7.

In the brake device 2 of the embodiment, the rotary block 24 of the rotation-linear motion converter 11 and the output section (adapter block 27) of the speed reducer 10 are connected together via the Oldham coupling 26. Therefore, when a large reaction force acts from the wheel brake unit 7 onto the piston 9, the intermediate piece of the Oldham coupling 26, or the floating block 28, slides to prevent the large reaction force from acting on the speed reducer 10 side. Accordingly, this arrangement makes it possible to downsize the bearings on the speed reducer 10 side.

The speed reducer 10 used in the brake device 2 of the embodiment includes the first and second carrier blocks 15A, 15B, the crankshafts 18, the first and second revolving gears 19A, 19B, and the outer cylinder 17, and the first and second carrier blocks 15A, 15B are connected to the speed reducer casing 51, and the outer cylinder 17 serves as an output rotator. The rotation of the electric motor 8 is transmitted to the crankshafts 18, and the eccentric portions 18a, 18b of each crankshaft 18 are rotatably engaged with the first and second revolving gears 19A, 19B. The first and second revolving gears 19A, 19B have the outer teeth 19A*a*, 19B*a* provided thereon, and the outer cylinder 17 has the inner tooth pins 20 on the inner peripheral surface thereof. The number of the inner tooth pins 20 is larger than the respective numbers of the outer teeth 19A*a*, 19B*a*. Therefore, the speed reducer 10 can decelerate the rotation of the electric motor 8 accurately and rapidly and transmit it to the rotation-linear motion converter 11.

The brake control system 100 of the embodiment includes the brake device 2, the object detecting device 4, the vehicle speed sensing device 5, and the brake control device 6. The object detecting device 4 detects an object outside the vehicle 1. The vehicle speed sensing device 5 senses the running speed of the vehicle 1. The brake control device 6 receives signals from the object detecting device 4 and the vehicle speed sensing device 5 and controls the electric motor 8 of the brake device 2 in accordance with the distance between the vehicle 1 and the object outside the vehicle 1 and the speed of the vehicle 1. Therefore, in the brake control system 100 of the embodiment, the brake control device 6 controls the electric motor 8 of the brake device 2 in accordance with the distance between the vehicle 1 and the object outside the vehicle 1 and the speed of the vehicle 1, thereby appropriately maintaining the distance between the vehicle 1 and the object outside the vehicle 1.

In particular, the brake device 2 used in the brake control system 100 of the embodiment can operate the wheel brake unit 7 accurately and rapidly by the power of the electric motor 8 and the deceleration performed by the speed reducer 10, as described above. Accordingly, the brake control system 100 of the embodiment can rapidly modify the distance between the vehicle 1 and the object outside the vehicle 1 so as to approach the target distance.

Second Embodiment

Figure 9:
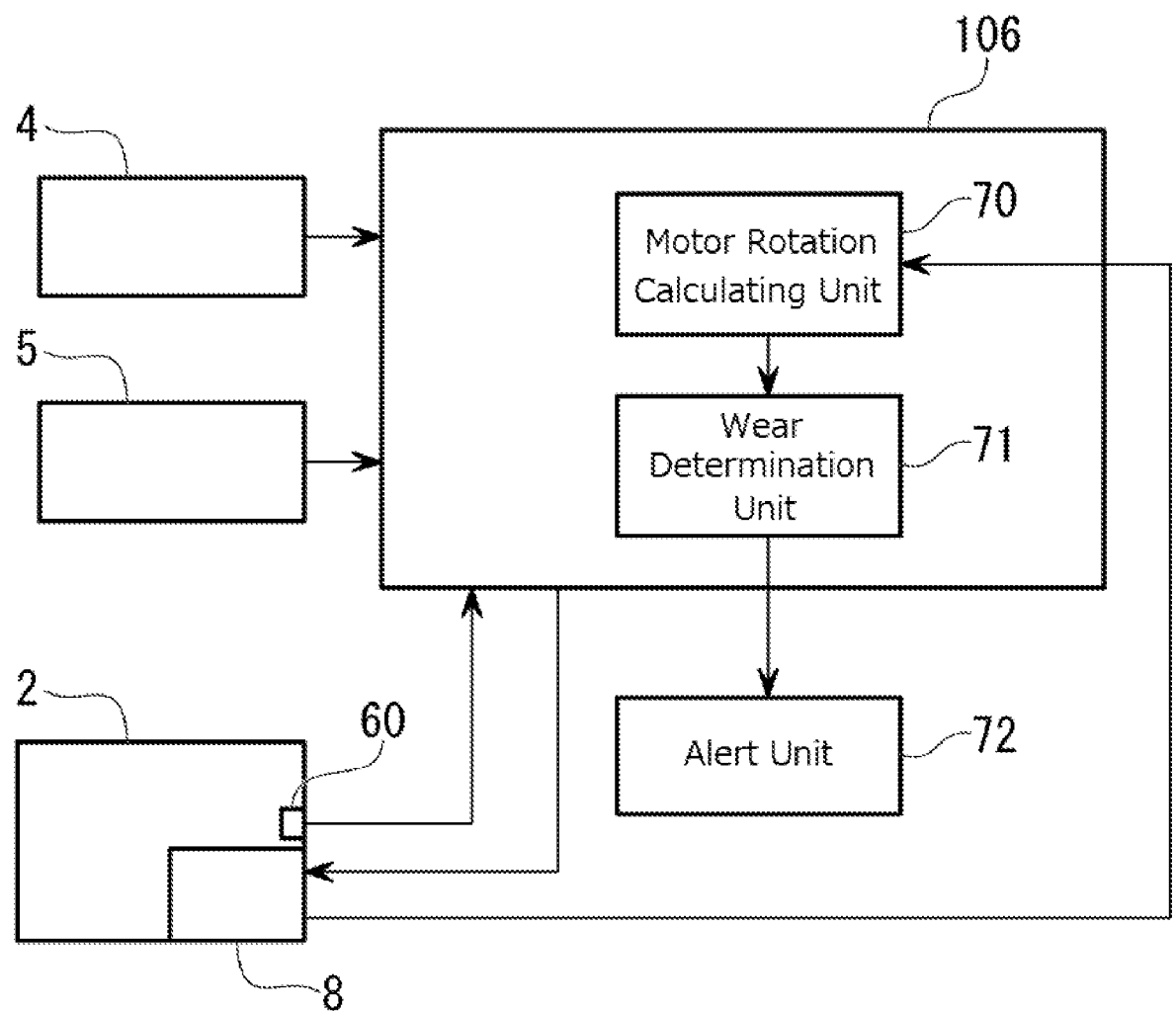
FIG. 9 is a control block diagram of the brake control system according to a second embodiment.

FIG. 9 is a control block diagram of the brake control system according to a second embodiment. The brake control system of the embodiment is basically configured in the same manner as in the first embodiment. The difference from the first embodiment is that the brake control system is capable of sensing the amount of wear of the brake pads in the wheel brake unit and informing the driver when the amount of wear of the brake pads has exceeded a prescribed level.

The brake control device 106 of the second embodiment includes a motor rotation calculating unit 70 and a wear determination unit 71. The motor rotation calculating unit 70 calculates the angle of rotation of the electric motor with respect to its initial position in braking. The wear determination unit 71 determines whether or not the amount of wear of the brake pads has exceeded the prescribed level based on the calculation result of the motor rotation calculating unit 70. In addition, an alert unit 72 is provided in the vehicle interior to inform the driver by lighting or other means when the wear determination unit 71 determined that the amount of wear of the brake pads has exceeded the prescribed level.

For example, when the brake device operates, the motor rotation calculating unit 70 calculates the angle of rotation of the electric motor made during the period from the time when the piston first contacts with a brake pad to the time when the brake pads press against the brake disk. More specifically, for example, the motor rotation calculating unit 70 senses the timing at which the piston first contacts with the brake pad and the timing at which the brake pads press against the brake disk based on the sensing result of the torque sensor 60 provided on the speed reducer or others, and then the motor rotation calculating unit 70 calculates the angle of rotation of the electric motor made between the two timings. The angle of rotation of the electric motor can be calculated based on the electric current supplied to the electric motor or other criteria.

The wear determination unit 71 previously stores a reference value of the angle of rotation on a storage thereof. The reference value is obtained in the same manner as described above using unworn brake pads, by calculating the angle of rotation of the electric motor made during the period from the time when the piston first contacts with the brake pad to the time when the brake pads press against the brake disk. The wear determination unit 71 compares the above angle of rotation of the electric motor in actual braking operation of the brake device to the reference value, and when the difference between the two is at or above a prescribed value, the wear determination unit 71 determines that the brake pads are worn.

Figure 10:
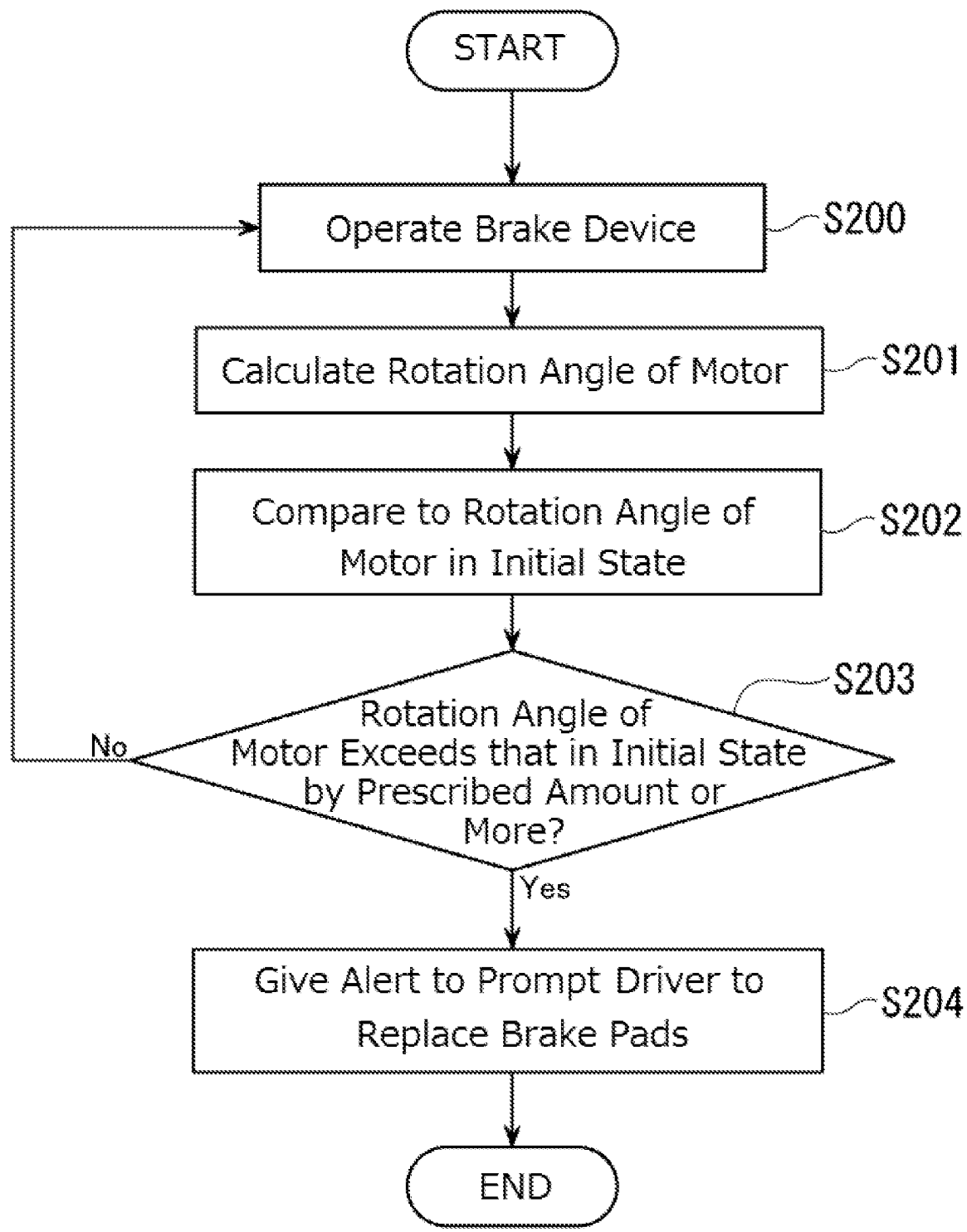
FIG. 10 is a flowchart showing an example of control of the brake control system according to the second embodiment.

FIG. 10 is a flowchart showing an example of control in determining whether the brake pads are worn during running of a vehicle. A description is hereinafter given of an example of control in determining whether the brake pads are worn, with reference to FIG. 10.

In step S200 of FIG. 10, the brake device is operated. Subsequently, in step S201, the wear determination unit 71 calculates the angle of rotation of the electric motor made during the period from the time when the piston first contacts with a brake pad to the time when the brake pads press against the brake disk, as described above. In step S202, the calculated angle of rotation of the electric motor is compared to the reference value. In step S203, it is determined whether or not the angle of rotation of the electric motor exceeds the reference value by a prescribed amount or more. If it does not, the control returns to step S200, and if it does, the control returns to step S204. In step S204, the alert unit 72 is operated to prompt the driver to replace the brake pads.

As described above, the brake device and the brake control system of the embodiment, which are basically configured in the same manner as in the first embodiment, can provide the same advantageous effects as the first embodiment. In the brake control system of the embodiment, the brake control device 6 includes the motor rotation calculating unit 70 and the wear determination unit 71. The motor rotation calculating unit 70 calculates the amount of rotation of the electric motor from the initial position to the braking position thereof. The wear determination unit 71 determines whether or not the brake pads are worn based on the calculation result of the motor rotation calculating unit 70. Therefore, the brake control system of the embodiment makes it possible to replace the brake pads at appropriate timings.

In particular, the brake control system of the embodiment includes the alert unit 72 that gives an alert when the wear determination unit 71 determines that the brake pads are worn to the prescribed level or more. Therefore, it is possible to inform the driver of the appropriate timing of replacing the brake pads.

The present invention is not limited to the above-described embodiments, and various modifications can be made within the scope of the present invention. In the above embodiments, the rotation-linear motion converter 11 includes the rotary block 24 and the casing 25. The rotary block 24 includes the cam mechanism, and the casing 25 houses the rotary block 24 in a rotatable manner and retains the piston 9 such that the piston 9 is movable forward and backward. The rotation-linear motion converter is not limited to this configuration but may be formed of, for example, a rack-pinion mechanism.

What is claimed is:

1. A brake device comprising:
a wheel brake unit for braking a wheel;
an electric motor for driving the wheel brake unit;
a speed reducer for decelerating rotation of the electric motor;
a rotation-linear motion converter for converting a rotational output of the speed reducer into a linear motion; and
a braking force transmission member for transmitting the linear motion produced by the rotation-linear motion converter to the wheel brake unit,
wherein the rotation-linear motion converter includes:
a rotary block configured to be rotated by the rotational output of the speed reducer; and
a casing housing the rotary block in a rotatable manner,
wherein the casing retains the braking force transmission member such that the braking force transmission member is movable forward and backward in a first direction substantially perpendicular to a rotational center axis of the rotary block,
wherein the rotary block includes:
a base portion having a cylindrical shape,
a cam block portion having a half cylindrical shape and a flat surface extending parallel to the rotational center axis of the rotary block, the cam block portion being integrally connected to the base portion, and
a cam mechanism for moving the braking force transmission member forward and backward at a position spaced from the rotational center axis, the cam mechanism having a center axis parallel to the rotational center axis and being embedded in the flat surface at an embedded position in which the center axis of the cam mechanism is spaced from the rotational center axis, and
wherein, when the rotary block rotates, the cam mechanism presses a first surface of the braking force transmission member facing the cam mechanism in the first direction, a second surface of the braking force transmission member on the other side of the first surface in the first direction presses the wheel brake unit in the first direction, and the wheel brake unit pressed by the second surface against the wheel in the first direction brakes the wheel.

2. The brake device according to claim 1, wherein the casing has a reaction force receiving surface supporting an outer peripheral surface of the rotary block and receiving a reaction force from the braking force transmission member when the reaction force from the braking force transmission member acts on the cam block portion.

3. The brake device according to claim 1, wherein the speed reducer includes a rotation output section, and
wherein the rotary block and the rotation output section are coupled to each other via an Oldham coupling.

4. The brake device according to claim 2, wherein the speed reducer includes a rotation output section, and
wherein the rotary block and the rotation output section are coupled to each other via an Oldham coupling.

5. The brake device according to claim 1, wherein the speed reducer includes:
a support block;
a crankshaft rotatably supported on the support block and configured to be rotated by a drive force of the electric motor;
a revolving gear rotatably engaged with an eccentric portion of the crankshaft to revolve along with the eccentric portion, the revolving gear having outer teeth; and
an outer cylinder disposed on an outer peripheral side of the revolving gear and configured to mesh with the outer teeth of the revolving gear, the outer cylinder retaining inner tooth pins on an inner peripheral surface thereof, a number of the inner tooth pins being larger than a number of the outer teeth,
wherein one of the support block and the outer cylinder is fixed on an outside member, and
wherein the other of the support block and the outer cylinder serves as a rotation output section.

6. A brake device comprising:
a wheel brake unit for braking a wheel;
an electric motor for driving the wheel brake unit;
a speed reducer for decelerating rotation of the electric motor;
a rotation-linear motion converter for converting a rotational output of the speed reducer into a linear motion; and
a braking force transmission member for transmitting the linear motion produced by the rotation-linear motion converter to the wheel brake unit,
wherein the rotation-linear motion converter includes:
a rotary block configured to be rotated by the rotational output of the speed reducer; and
a casing housing the rotary block in a rotatable manner and retaining the braking force transmission member such that the braking force transmission member is movable forward and backward in a first direction substantially perpendicular to a rotational center axis of the rotary block, and
wherein the rotary block includes:
a base portion having a cylindrical shape,
a cam block portion shaving a half cylindrical shape and a flat surface extending parallel to the rotational center axis of the rotary block, the cam block portion being integrally connected to the base portion, and
a cam mechanism for moving the braking force transmission member forward and backward at a position spaced from the rotational center axis, the cam mechanism having a center axis parallel to the rotational center axis and being embedded in the flat surface at an embedded position in which the center axis of the cam mechanism is spaced from the rotational center axis,
wherein the casing has a reaction force receiving surface supporting an outer peripheral surface of the rotary block and receiving a reaction force from the braking force transmission member when the reaction force from the braking force transmission member acts on the cam block portion,
wherein the rotary block and a rotation output section of the speed reducer are coupled to each other via an Oldham coupling, and
wherein when the rotary block rotates, the cam mechanism presses a first surface of the braking force transmission member facing the cam mechanism in the first direction, a second surface of the braking force transmission member on the other side of the first surface in the first direction presses the wheel brake unit in the first direction, and the wheel brake unit pressed by the second surface against the wheel in the first direction brakes the wheel.

7. A brake control system comprising:
a brake device including:
a wheel brake unit for braking a wheel;
an electric motor for driving the wheel brake unit;
a speed reducer for decelerating rotation of the electric motor;
a rotation-linear motion converter for converting a rotational output of the speed reducer into a linear motion; and
a braking force transmission member for transmitting the linear motion produced by the rotation-linear motion converter to the wheel brake unit;
an object detecting device for detecting an object outside a vehicle;
a vehicle speed sensing device for sensing a running speed of the vehicle; and
a brake control device configured to receive signals from the object detecting device and the vehicle speed sensing device and control the electric motor of the brake device in accordance with a distance between the vehicle and the object outside the vehicle and the running speed of the vehicle,
wherein the rotation-linear motion converter includes:
a rotary block configured to be rotated by the rotational output of the speed reducer; and
a casing housing the rotary block in a rotatable manner,
wherein the casing retains the braking force transmission member such that the braking force transmission member is movable forward and backward in a first direction substantially perpendicular to a rotational center axis of the rotary block,
wherein the rotary block includes:
a base portion having a cylindrical shape,
a cam block portion shaving a half cylindrical shape and a flat surface extending parallel to the rotational center axis of the rotary block, the cam block portion being integrally connected to the base portion, and
a cam mechanism for moving the braking force transmission member forward and backward at a position spaced from the rotational center axis, the cam mechanism having a center axis parallel to the rotational center axis and being embedded in the flat surface at an embedded position in which the center axis of the cam mechanism is spaced from the rotational center axis, and
wherein when the rotary block rotates, the cam mechanism presses a first surface of the braking force transmission member facing the cam mechanism in the first direction, a second surface of the braking force transmission member on the other side of the first surface in the first direction presses the wheel brake unit in the first direction, and the wheel brake unit pressed by the second surface against the wheel in the first direction brakes the wheel.

8. The brake control system of claim 7, further comprising:
a motor rotation sensing unit for sensing an amount of rotation of the electric motor from an initial position to a braking position thereof; and
a wear determination unit for determining whether or not the wheel brake unit is worn based on a sensing result of the motor rotation sensing unit.

9. The brake control system of claim 8, further comprising an alert unit for giving an alert when the wear determination unit determines that the wheel brake unit is worn to a prescribed level or more.

* * * * *